(12) United States Patent
Tamma et al.

(10) Patent No.: US 7,418,461 B2
(45) Date of Patent: Aug. 26, 2008

(54) SCHEMA CONFORMANCE FOR DATABASE SERVERS

(75) Inventors: Leela S. Tamma, Fremont, CA (US); Krishna C. Vitaldevara, Santa Clara, CA (US); Durgesh Srivastava, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 11/035,923

(22) Filed: Jan. 14, 2005

(65) Prior Publication Data

US 2006/0161558 A1 Jul. 20, 2006

(51) Int. Cl.
*G06F 17/30* (2006.01)
(52) U.S. Cl. .......................................... 707/201; 707/10
(58) Field of Classification Search .................. 707/201, 707/10
See application file for complete search history.

(56) References Cited

U.S. PATENT DOCUMENTS 6,457,011 B1 * 9/2002 Brace et al. ................... 707/10
2005/0071359 A1 * 3/2005 Elandassrry et al. ........ 707/102
2005/0234934 A1 * 10/2005 Mackay et al. .............. 707/100

* cited by examiner

*Primary Examiner*—Joon H Hwang
(74) *Attorney, Agent, or Firm*—Vierra Magen Marcus & DeNiro LLP (57) ABSTRACT

Automatically determining the conformance of database server schema. Maintaining conformance of database schema helps manage and sustain database driven services and applications. Schema for a pair of randomly selected databases are generated and compared. A diffgram is generated from the difference of the database schema. An alarm message can then be sent to an alarm server with the differences of the comparable databases. A master schema dump can be compared to selected database servers within the database system concurrently with the comparable database pair schema processing. A diffgram is generated in response to the comparison between the selected database schema and the master schema.

15 Claims, 7 Drawing Sheets

SCHEMA CONFORMANCE FOR DATABASE SERVERS

BACKGROUND OF THE INVENTION

1. Field of the Invention

The present invention is directed to managing operation of database servers.

2. Description of the Related Art

Most current enterprise and world wide web applications are data driven. These applications depend on data such as user data, electronic mail system data and other data to provide services and respond to client requests. Many enterprise database solutions incorporating one or more databases exist to support such applications. The reliability and performance of the enterprise and web applications depends on the performance of the driving database.

When a malfunction occurs in a database, the malfunction is usually detected in a peripheral application before it is detected in the database itself. For example, if a database does not respond to a particular client request, a database driven web page may not operate properly. A user or other some monitoring service will typically detect the degraded web page performance. After initial deployment, databases can experience degradation in performance or not respond to any requests at all. These problems are generally detectable, but the sheer numbers of database servers in a database system make their performance difficult to monitor. Additionally, it is difficult to determine the cause of the performance degradation. Upon being diagnosed, database problems are usually due to incorrectly configured or mismatched databases across the farm of servers.

When a database does not operate properly, it requires time to repair the database. During this time, a system of databases is put under more strain to compensate for the lost database. The applications driven by the database system may suffer from poor performance before the database malfunction is detected and compete for a smaller pool of resources while the database is being repaired. It is important to maintain database system health and detect a down or degraded database server as soon as possible.

SUMMARY OF THE INVENTION

The invention, roughly described, relates to automated schema conformance for a particular group of database servers. In one embodiment, a method for determining the conformance of a server begins with retrieving a first set of schema information from a first database server. Next, a second set of schema information is retrieved from a second database server. The first set of schema information is then compared to the second set of schema information. A difference file is then generated in response to comparing the first and second set of schema information.

An embodiment of a system for determining the conformance of a server includes two or more database servers, a comparator engine and a difference file generator. The database servers each include server information. The comparator engine is configured to perform a comparison of database server schema of one or more of the database of servers. The difference file generator is responsive to the comparator device.

DETAILED DESCRIPTION

The present invention automatically conforms the schema of a plurality of database servers to a desired schema set and maintains uniformity of a plurality of database schema. Databases having schema that conform to a desired schema will operate in a similar and efficient manner. Detecting database schema that differs from the norm alerts a system administrator that a database requires attention and possible repair. This helps achieve early detection of possible database malfunction and allows for database repair before a severe degradation in database performance occurs. In this manner, maintaining conformance of database schema helps maintain the health of a database system. This provides for better management of services and applications that depend or are driven by the conforming databases.

Two processes can be performed simultaneously or separately to ensure verification and conformance of database schema within a database system. The first process involves comparing schema for a pair of randomly selected databases. In this process, two comparable databases are first selected randomly from within a set of databases. The schema dump from each comparable database is then generated and compared. If the two schema dumps differ, a diffgram is generated from the difference of the database schema. An alarm message can then be sent to an alarm server within or in communication with the database system. The alarm message may include the differences between the schema and identification of both database severs.

Another process to ensure conformance of database schema involves comparing the schema of a selected database to a master schema. A master schema dump can be compared to selected database servers within the database system concurrently with the comparable database pair schema processing. The selected database can be a database of high importance, relevance, or concern. A diffgram is generated in response to the comparison between the selected database schema and the master schema. If the diffgram indicates differences exist between the master schema and the selected database schema, an alarm message is generated.

In one embodiment, schema is the organization or structure of a database. A database schema may contain an abstract representation of the objects within a database, including object characteristics, attributes, elements and relationships to other objects. Schema typically describes an XML object (for example, a document or a portion of a document), but may describe other object types. A schema dump for a server, such as a database server, is a compilation of descriptions and characteristics for the objects within that server. To create a schema for a server, the server structure is analyzed or parsed and each structural element is defined as it is encountered. For example, within a schema for a document describing a web site, a web site element, a web page element, and other elements are defined that describe possible content divisions within any page on that site. Elements are defined within a set of tags similar to XML and HTML. Generating and comparing schema is discussed in more detail below.

A difference file having difference information generated from comparing database server schema can be implemented as a diffgram. A diffgram is an XML string written according to a particular schema or difference in schema difference. Diffgrams can be used to identify current and original versions of data elements within a database. For example, when comparing two original sets of schema, the diffgram can indicate the previous version of one or both schema sets and a new version of the schema set after comparing the two original schemas. If the original schema sets are identical, the diffgram will indicate there is no difference between the previous and current version of the schema sets. A typical diffgram can contain data such as row state, row error, current row value and original row value information for a database. Row state information indicates whether row data for a schema or between two compared schema sets has changed. Row error information indicates whether an error occurred in comparing row data between schema sets. Generating and processing a diffgram is discussed in more detail below.

Figure 1:
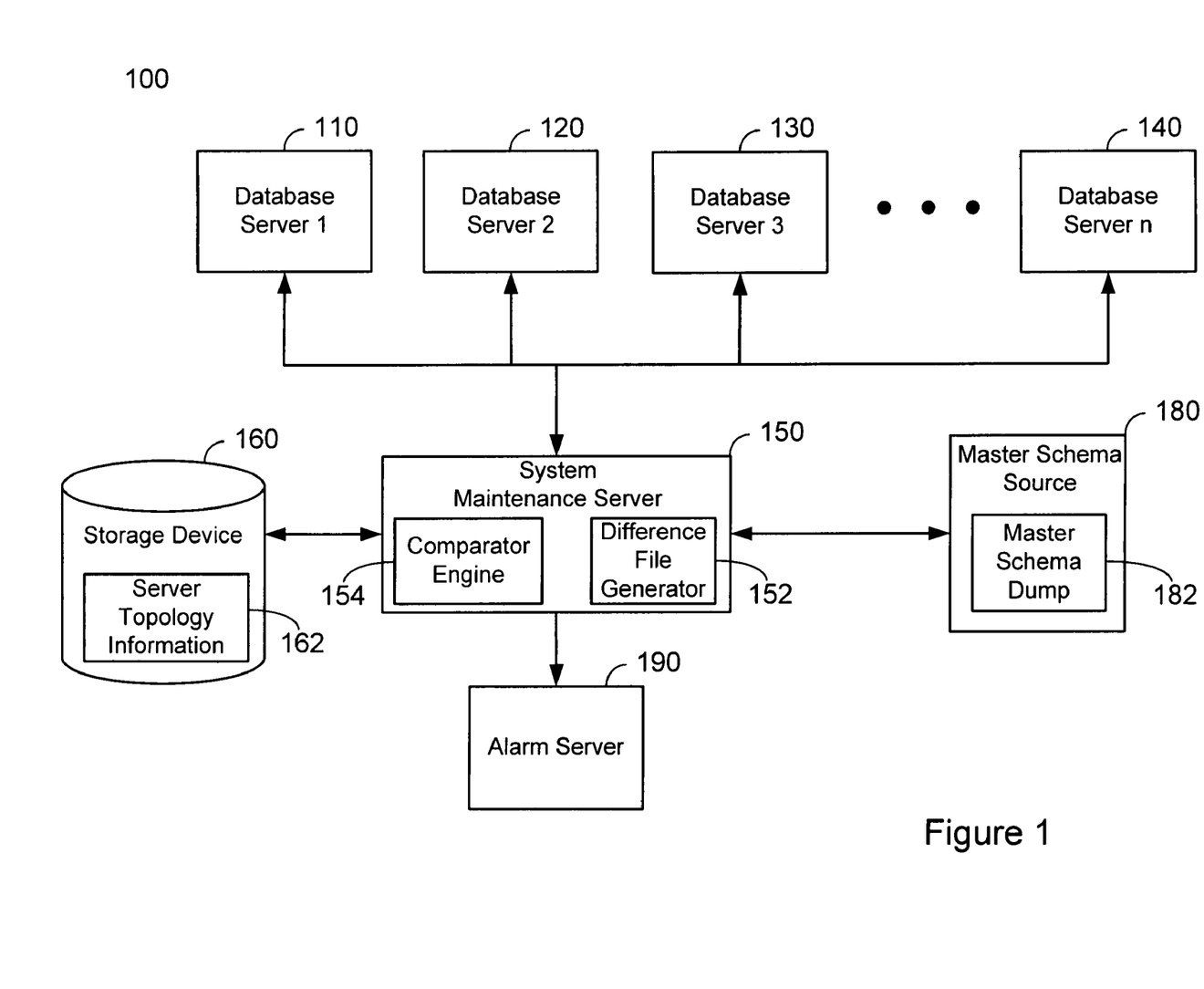
FIG. 1 illustrates one embodiment of a database server system suitable for use with the present invention.

FIG. 1 illustrates one embodiment of a system suitable for use with the present invention. System 100 of FIG. 1 includes database servers 110, 120, 130 and 140, system maintenance server 150, storage device 160, master schema source 180 and alarm server 190. System maintenance server 150 includes comparator engine 154 and difference file generator 152. Master schema source 180 includes master schema dump 182. Storage device 160 includes server topology information 162. Database servers 110-140 are connected to system maintenance server 150. System maintenance server may exchange information with storage device 160, master schema source 170 and alarm source 190. In one embodiment, database servers 110-140 can be deployed as structured query language (SQL) servers. In this case, SQL servers can respond to queries from client machines (not shown) formatted in SQL.

System maintenance server 150 is configured to select database servers to compare, generate schema dumps for each database server, and compare database server schema. Database servers to compare can be selected from topology information 162 retrieved from storage device 160. In one embodiment, comparator engine 154 performs comparisons of database schema and difference file generator 154 generates a difference file, such as a diffgram. Methods 300-700 of FIGS. 3-7, respectively, are implemented by system maintenance server 150 and discussed in more detail below.

Storage device 160 is configured to include database system information such as server topology information 162. Server topology information 162 may include location and/or access information for servers in a particular system, such as database servers 110-140, and release or version information for a database server such that it can be compared to similar servers. Alarm server 190 is configured to provide an alert to a system administrator or some other recipient. Generation of an alert may be initiated by receipt of an alert message from system maintenance server 150. In this case, alarm server 190 generates an alert message in response to receiving a signal from system maintenance server 150. Master schema source 180 provides a master schema dump for comparison against other servers. The source may be a server, a storage device or some other source of information. The components of system 100 are discussed in more detail below.

Figure 2:
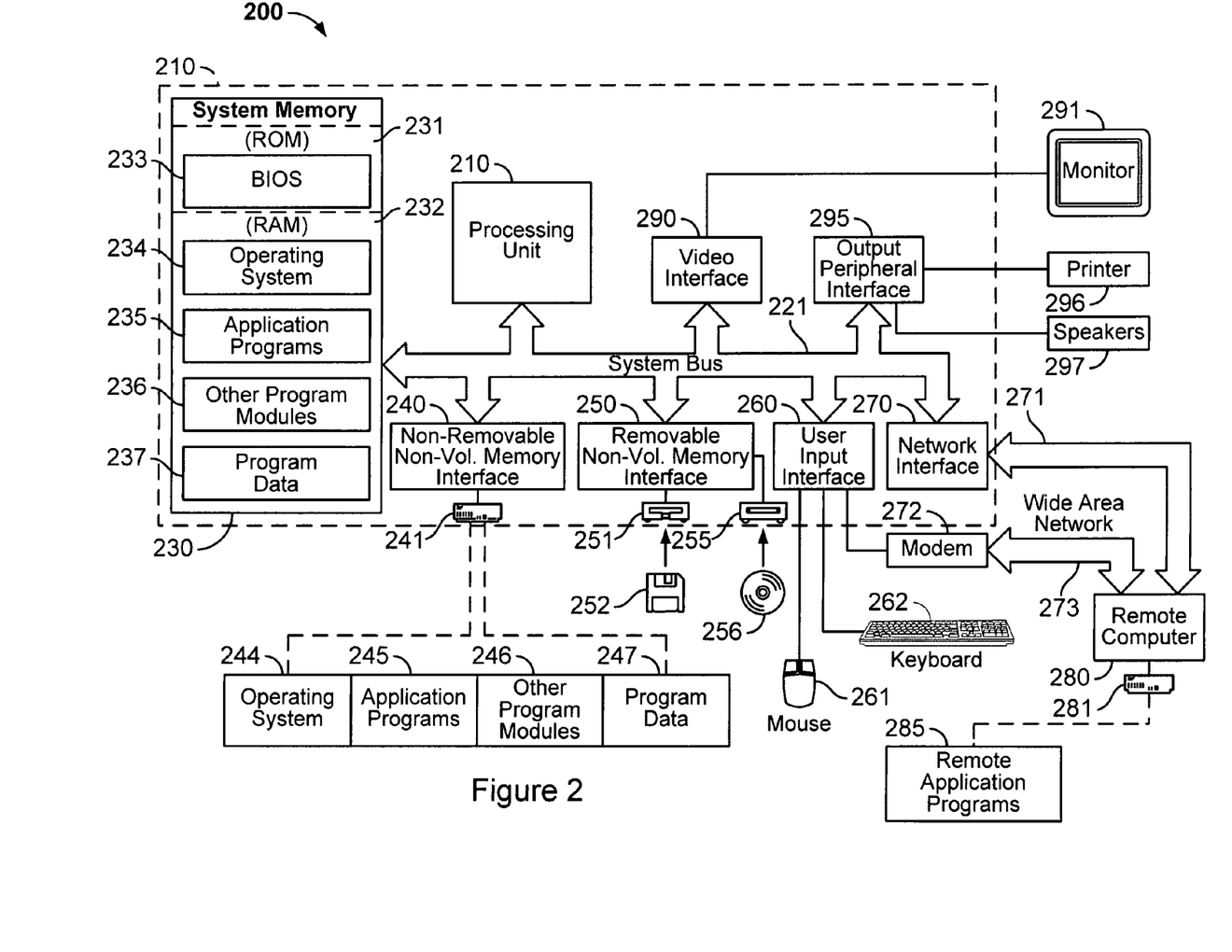
FIG. 2 is an illustration of one embodiment of a computing system for use with the present invention.

FIG. 2 is an illustration of one embodiment of a computing environment for use with the present invention. The computing system of FIG. 2 can be used to implement the servers and storage devices illustrated in system 100 of FIG. 1. In one embodiment, the computing environment can be used to implement the servers and computing devices illustrated in FIGS. 1A-1C.

FIG. 2 illustrates an example of a suitable computing system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

Figure 3:
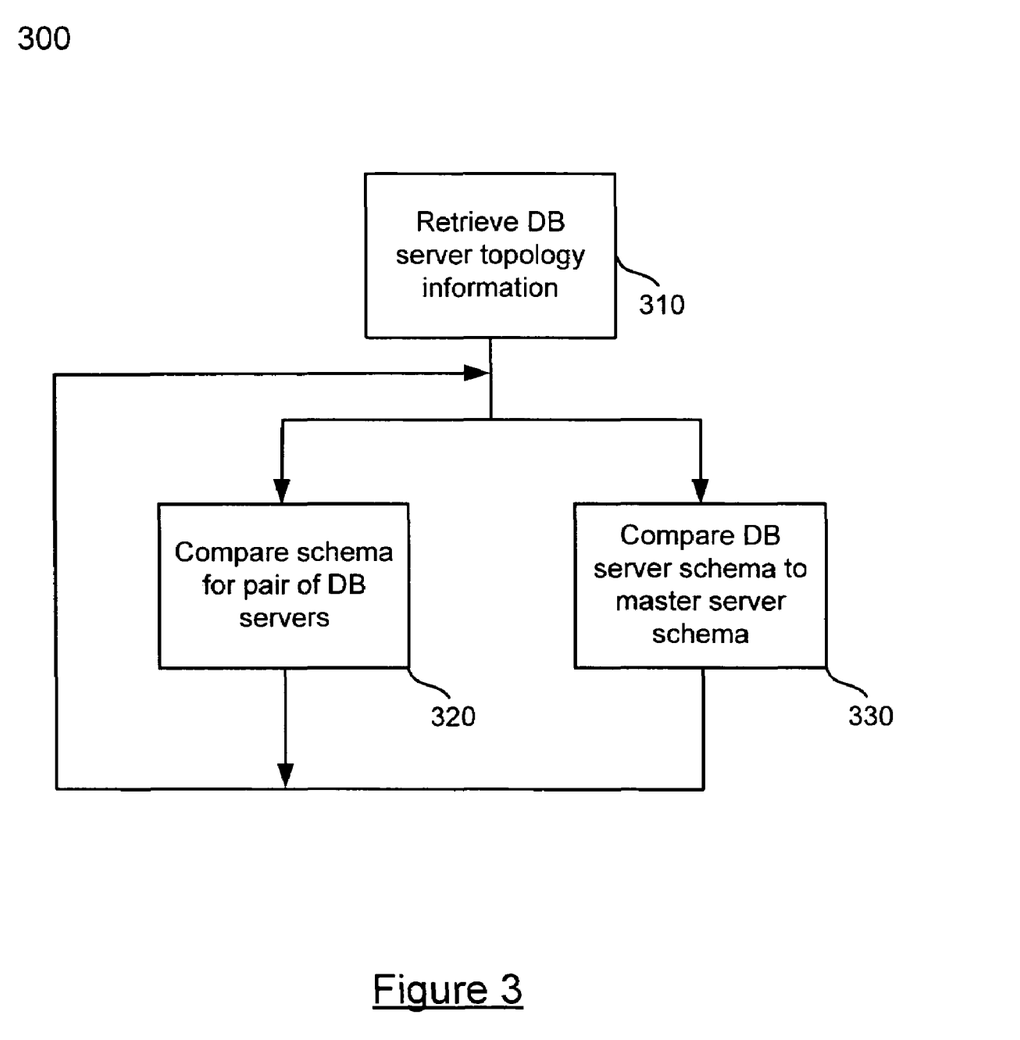
FIG. 3 illustrates a method for determining the conformance of a plurality of database servers.

FIG. 3 illustrates a method 300 for determining the conformance of a plurality of database servers. In one embodiment, method 300 is implemented by system maintenance server 150. First, database server topology information is retrieved at step 310. In one embodiment, topology information 162 is retrieved from storage device 160 by system maintenance server 150. Once retrieved, server topology information 162 is stored locally in the system maintenance server 150. The database server topology information may include network information, permission information, content, functionality, release and version information. In one embodiment, the server topology information includes information required by the system maintenance server to determine which database servers to compare, such as a list of comparable servers. This is discussed in more detail below. After retrieving the topology information, schema for a pair of database servers is compared at step 320. Comparing server pair schema helps maintain uniformity over a plurality of database servers. In one embodiment, the comparable database server pairs are selected randomly to sample representative servers in a database server system. In this manner, the comparison will not be performed on the same servers in the same order at every execution of method 300. Comparison of the pair of database server schema is discussed in more detail below with respect to method 400 of FIG. 4.

Concurrently with step 320, the system compares database server schema to master server schema at step 330. Step 330 ensures that a selected server is in conformance with a master set of schema. In one embodiment, the selected server to compare to the master server schema is of high importance, a new version or release, susceptible to degradation or breakdown, or an otherwise desirable database server to monitor. Comparison of server schema to master server schema is discussed in more detail below with respect to method 500 of FIG. 5. Operation of method 300 continues from step 320 and 330 to repeat these steps for the length of the session of system maintenance server 150 or until the conformance process is terminated by a system administrator.

As discussed above, steps 320 and 330 can be performed simultaneously. In another embodiment, steps 320 and 330 may be performed independently of each other. Either embodiment is within the scope of the present invention.

Figure 4:
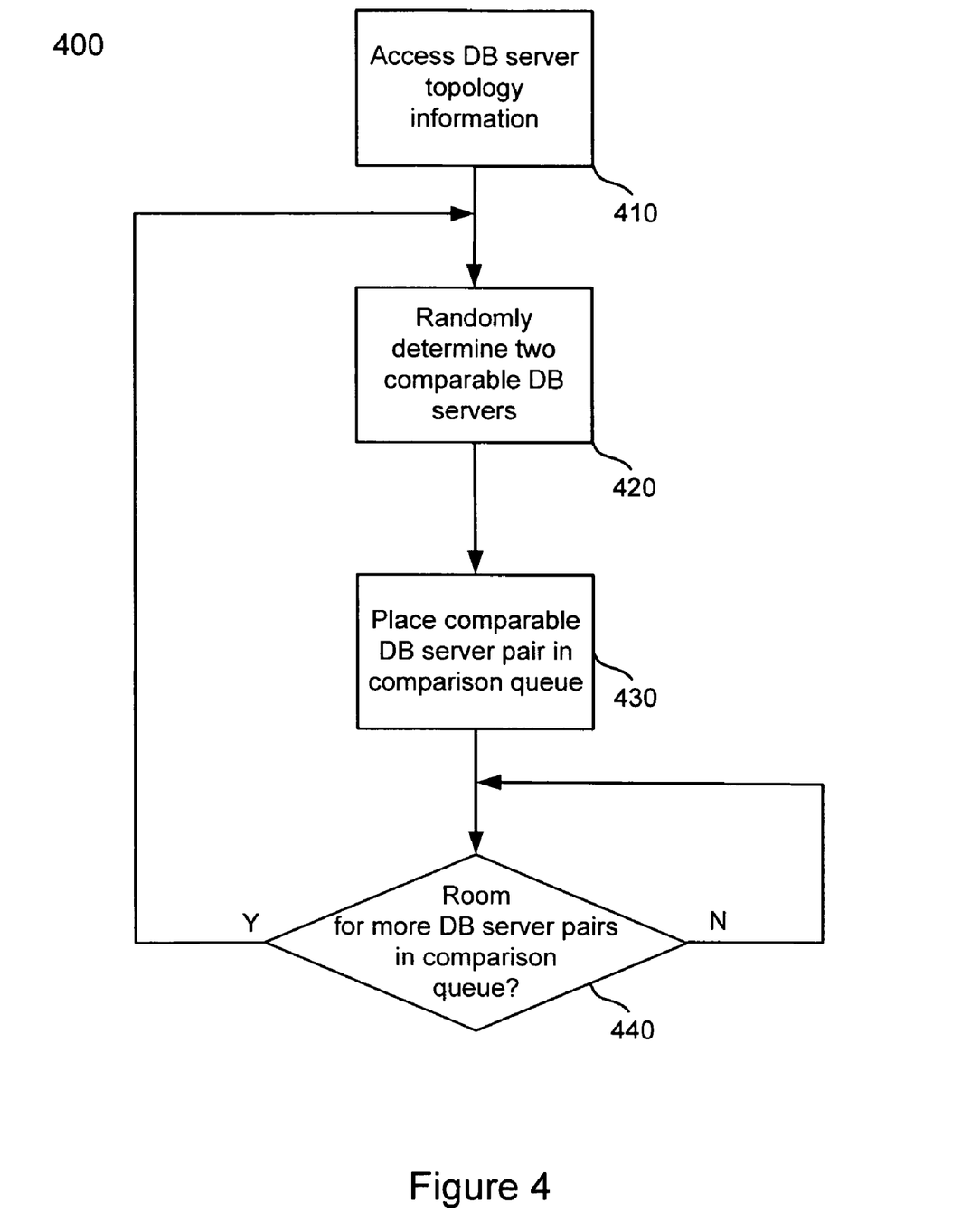
FIG. 4 illustrates one embodiment of a method for scheduling database server pair comparisons.
Figure 5:
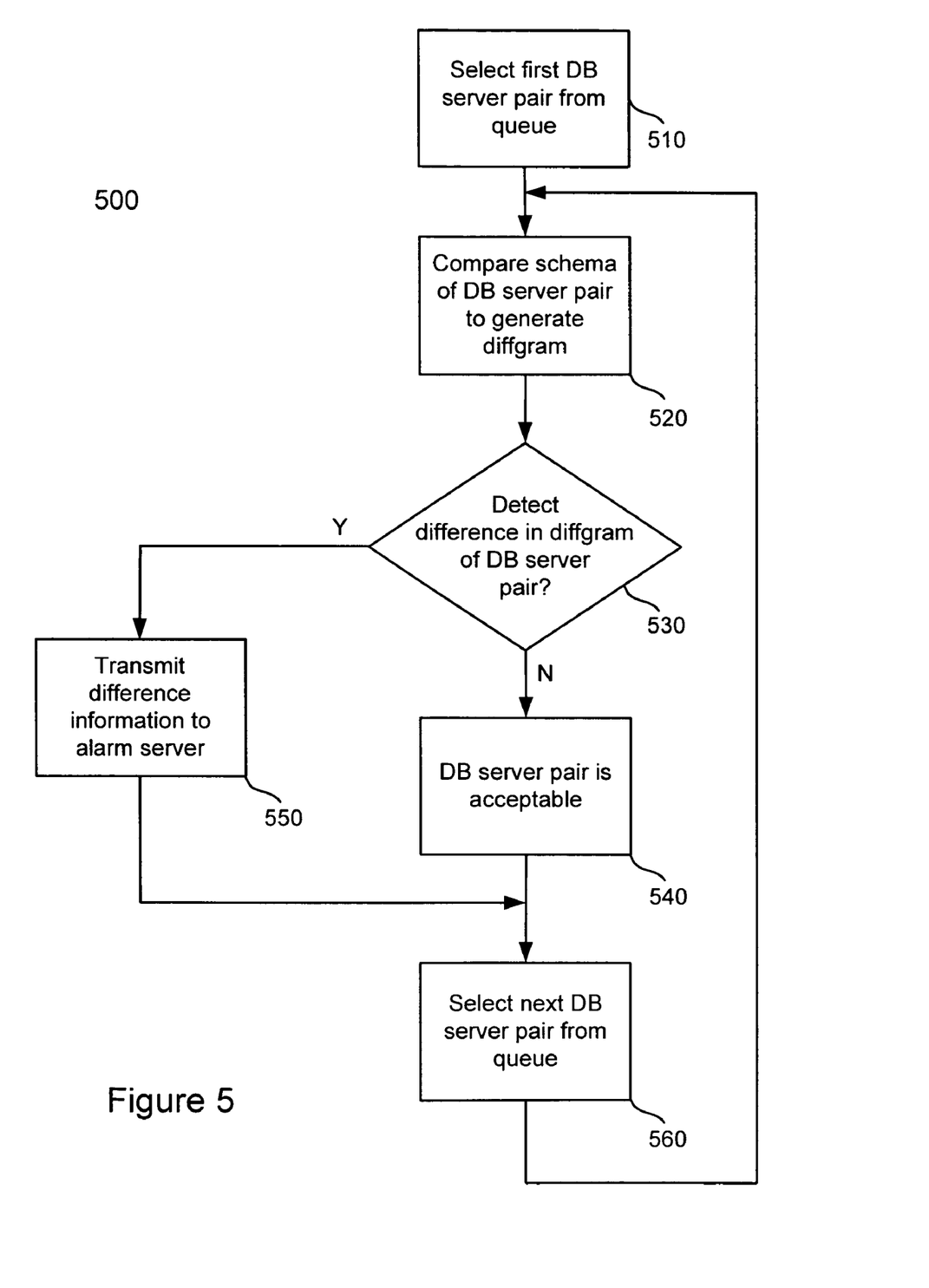
FIG. 5 illustrates one embodiment of a method for performing database server pair schema comparisons.

FIGS. 4 and 5 illustrate one embodiment for comparing a pair of database server schema as discussed above with respect to step 320 of method 300. The methods illustrated in FIGS. 4 and 5 can be performed simultaneously by system maintenance server 150.

Method 400 of FIG. 4 illustrates one embodiment of a method for scheduling database server comparisons. First, database server topology information is accessed at step 410. In one embodiment, the topology information retrieved at step 310 of method 300 is accessed at step 410. Next, the system two comparable database servers are randomly determined at step 420. The two comparable servers are chosen randomly from the topology information. In one embodiment, the two comparable servers are selected from a comparable server list within the topology information. The random determination provides for better cross-section of the server system than if chosen in a designated order. In one embodiment, comparable database servers are servers that perform a similar function, are of the same type, release or version, or are similar in some other manner such that their respective schema dumps should be similar.

A comparable database server pair is placed in a comparison queue at step 430. In one embodiment, the queue is an execution queue located within a processor of system maintenance server 150. The queue entries are processed as discussed below with respect to method 500. Next, a determination is made as to whether there is space for more database server pairs in the comparison queue at step 440. If there is no space for additional database server pairs in the comparison queue, operation remains at step 440 until space is available. If space is available in the comparison queue for additional server pairs, operation continues to step 420, wherein another pair of comparable database servers are placed in the queue.

FIG. 5 illustrates one embodiment of a method for performing database server schema comparisons. First, a first database server pair is selected from a comparison queue at step 510. As discussed above, the queue may be located within system maintenance server 150 of system 100. Next, the schema of the database server pairs are compared to generate a diffgram at step 520. This comparison is performed to ensure conformance of database servers to each other and help establish a uniform database server system. In one embodiment, the step of comparing database server schema includes generating a schema dump, comparing the generated schema dumps and generating a diffgram. Generating schema and comparing the schema of a database server pair and generating a diffgram is discussed in more detail below with respect to method 600 of FIG. 6.

The difference between the schema of a pair of database servers as indicated in a diffgram of the database server pair is detected at step 530. In one embodiment, system maintenance server 150 determines whether the generated diffgram has difference content. If at step 530 differential content is detected in a diffgram of the database server pair, operation continues to step 550. If no difference is detected in the diffgram, operation continues to step 540. At step 540, the database servers have matching schema and are deemed acceptable. Operation then continues to step 560. At step 550, the detected difference information is transmitted to an alarm server. In one embodiment, difference information is transferred from system maintenance server 150 to alarm server 190. Transmittal of the difference information can initiate generation of an alarm message sent by alarm server 190. The alarm message can serve to notify the system of a difference detected between two database servers in the system. In one embodiment, the difference information transmitted to alarm server 190 from system maintenance server 150 may include the diffgram, server identification information, time-stamped information, and server identification information for the server that performed the difference and generation operations. Operation then continues to step 560. The next comparable database server pair is then selected from the comparison queue at step 560. Operation then continues to step 520 where the schema of the next database pair is compared.

In one embodiment, the methods of FIGS. 4-5 are implemented continuously. In this case, the random selection of the comparable servers may be performed repeatedly at regular intervals. In some embodiments, the random selection is performed repeatedly, but not necessarily at a regular interval.

Figure 6:
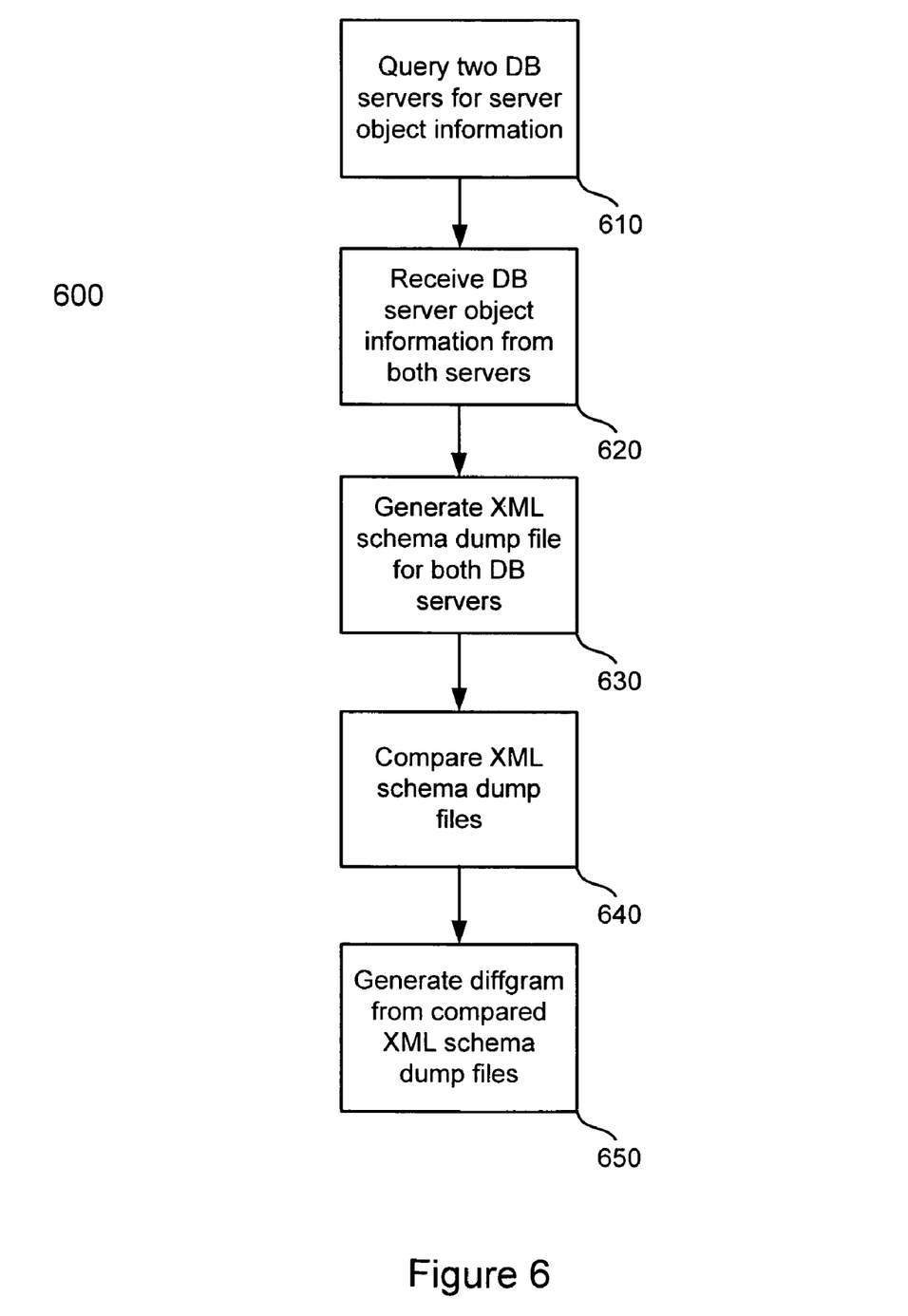
FIG. 6 illustrates one embodiment of a method for comparing schema and generating a diffgram.

FIG. 6 illustrates one embodiment of a method for comparing schema and generating a diffgram as discussed above in step 520 of method 500. First, two database servers are queried for server object information at step 610. The database server query may be used to extract several different types of information from the database server. In one embodiment, the server object information subject to the query may include objects as exposed by the SQL server. These exposed objects may include tables, indexes, views, triggers, stored procedures, user-defined functions, constraints and database options for each database. The query may also extract static application-specific data as required by the application that is being hosted using programming language as supported by the particular database server. In addition, the query may extract essential roles and/or users that have access to each of the database servers. The query may also check for server management tools in the presence of jobs within the server and each individual step that each job may perform. In one embodiment, the query also checks various properties associated with these jobs, such as database, repeat interval and other such jobs. In one embodiment, the same query is performed on both database servers in the pair to determine whether the databases are similar. Other types of queries are possible and can be performed as needed to determine the design data for a particular database server. Such variations of a query performed upon two database servers or server object information are considered within the scope of the present invention.

Database server object information is received from the servers at step 620. The information is received in response to the query made above at step 610. Next, the system generates an XML schema dump file for each database server queried. The XML schema dump file is generated by system maintenance server 150 from the object information received at step 620. Each XML schema dump file is a snapshot of the information received from a database server. In one embodiment, an XML Schema Definition (XSD) is used to define an XML dump file. XSD specifies how to formally describe the elements in an XML document. This description can be used to verify that each item of content in a document adheres to the description of the element in which the content is to be placed.

Below is a portion of an example of an XSD that a schema dump XML file conforms to. The XSD lists various elements which the schema conformance application examines. An example of an entire XSD can be found at the web site www.w3.org/2001/XMLSchema.

```
<xs:schema xmlns="xsddatabaseDump"
    targetNamespace="xsddatabaseDump"
        xmlns:xs="http://www.w3.org/2001/XMLSchema">
        <xs:complexType name="PropertyType">
            <xs:sequence>
                <xs:element name="name" type="xs:string"
                    minOccurs="1"
maxOccurs="1"></xs:element>
                <xs:element name="value" type="xs:string"
                    minOccurs="1"
maxOccurs="1"></xs:element>
            </xs:sequence>
        </xs:complexType>
        <xs:complexType name="PropertiesType">
            <xs:sequence>
                <xs:element name="property" type="PropertyType"
                    minOccurs="1"
maxOccurs="1"></xs:element>
                <xs:element name="script" type="xs:string"
                    minOccurs="1"
maxOccurs="1"></xs:element>
                <xs:element name="indexes" type="IndexesType"
                    minOccurs="1"
maxOccurs="1"></xs:element>
                <xs:element name="triggers" type="TriggersType"
                    minOccurs="1"
maxOccurs="1"></xs:element>
            </xs:sequence>
        </xs:complexType>
        <xs:complexType name="TablesType">
            <xs:sequence>
                <xs:element name="table" type="TableType"
                    minOccurs="0"
maxOccurs="unbounded"></xs:element>
            </xs:sequence>
        </xs:complexType>
        <xs:complexType name="SprocsType">
            <xs:sequence>
                <xs:element name="sproc" type="ObjectType"
                    minOccurs="0"
maxOccurs="unbounded"></xs:element>
            </xs:sequence>
        </xs:complexType>
        <xs:complexType name="FunctionsType">
            <xs:sequence>
                <xs:element name="function" type="ObjectType"
                    minOccurs="0"
maxOccurs="unbounded"></xs:element>
            </xs:sequence>
        </xs:complexType>
        <xs:complexType name="ViewsType">
            <xs:sequence>
                <xs:element name="view" type="ObjectType"
                    minOccurs="0"
maxOccurs="1"></xs:element>
            </xs:sequence>
        </xs:complexType>
        <xs:element name="databaseDump"
            type="DatabaseDumpType"
minOccurs="1" maxOccurs="1"></xs:element>
</xs:schema>
```

The generated XML schema dump files are compared at step 640. In one embodiment, the comparison is performed by system maintenance server 150. The comparison involves comparing each element of each XML schema dump file as described by its respective XSD to the other XML schema dump file. A diffgram is then generated from the compared XML schema dump files at step 650. In one embodiment, the diffgram is generated by system maintenance server 150. The diffgram may include a file having elements contained in one schema file and not contained in another. For example, generalized schema dump files for a first schema file schema1 and a second schema-file schema2 are listed below.

```
<schema1>
    <x>
    <y>
</schema1>
```

```
<schema2>
    <x>
    <z>
</schema2>
```

A generalized diffgram computed between the schema1 and schema2 files is listed below.

```
<diffgram>
    <diff1><y>
    <diff2><z>
</diffgram>
```

As illustrated, schema1 includes data elements (x) and (y). Schema2 includes data elements (x) and (z). Accordingly, the diffgram includes a first differential element (y) and a second differential element (z).

Figure 7:
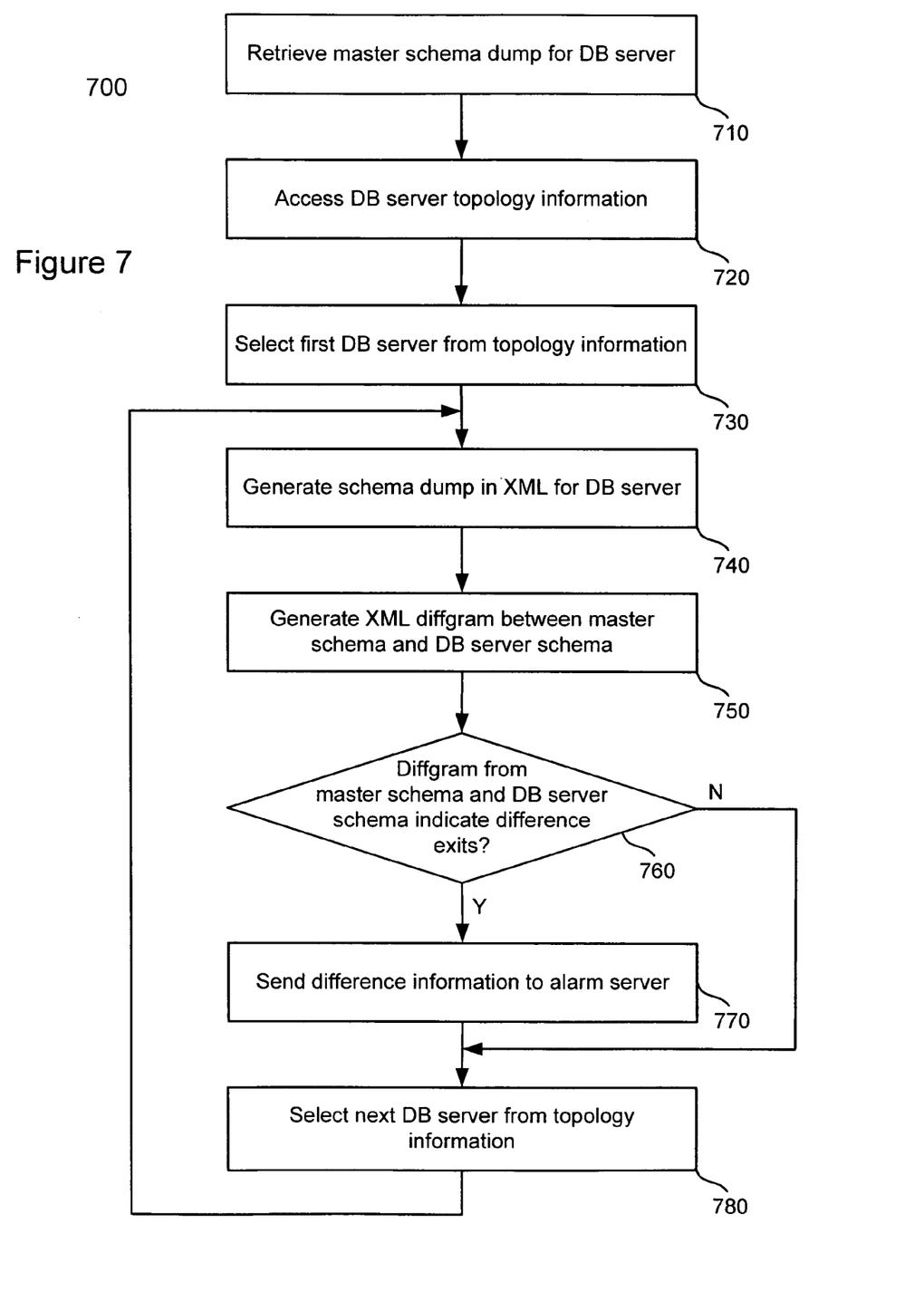
FIG. 7 illustrates one embodiment of a method for comparing database server schema to master schema.

In some embodiments, a diffgram can be generated by comparing an XML schema dump file from one database server to other information, such as a master set of schema. Method 700 of FIG. 7 illustrates one embodiment of a method for comparing database server schema to master schema as discussed in step 330 of FIG. 3. Method 700 begins with retrieving a master schema dump for a database server at step 710. The master schema dump can be a file retrieved from a server or from some other source. In one embodiment, the master schema can be generated as a result of a quality assurance process. Database server topology information is accessed at step 720. In one embodiment, the accessed server topology information is the topology information retrieve at step 310 of method 300. Next, a first database server is selected from the topology information at step 730. In one embodiment, the first database server is a server of some importance or significance as discussed above. The first database server is chosen such that it has a schema dump that should match the master schema dump.

A schema dump is generated for the selected database server at step 740. In one embodiment, the schema dump is in XML and generated in a similar manner and with similar elements as that discussed above with respect to step 630 of method 600. Next, an XML diffgram is generated between the master schema and the database server schema at step 750. Step 750 is performed as discussed above with respect to step 640 of method 600 in FIG. 6. In this case, however, generation of the schema dump and an XML diffgram are performed with respect to one server. A determination is then made as to whether the diffgram from the master schema and the database server schema indicate a difference exists between the two schemas at step 760. In one embodiment, the determination is whether the selected server schema is different than the master server schema. If there is no difference between the selected server schema and the master schema at step 760, operation continues to step 780. In this case, the system determines that the schemas are the same and the selected server matches the master server schema. If a diffgram from the compared schema indicate a difference does exist, then the difference information associated with the diffgram is transmitted to an alarm server at step 770. In one embodiment, the difference information includes the diffgram in step 750. In some embodiments, alarm server 190 will generate an alarm message to a system administrator indicating the type of difference information received from system maintenance server 150. Next, the next database server to be compared to the master schema is selected from the topology information at step 780. Operation then continues to step 740.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for determining a conformance of a server, comprising:
    retrieving a first set of schema information from a first database server, the first set of schema information describing a current structure of the first database server;
    retrieving a second set of schema information from a second database server, the second set of schema information describing a current structure of the second database server;
    comparing the first set of schema information to the second set of schema information to determine if the schema information for the first database server and the second database server are different, said step of comparing the first set of schema information to the second set of schema information initiated by a maintenance server;
    generating a first difference file responsive to said step of comparing the first and second set of schema information;
    retrieving a third set of schema information from a third database server, the third set of schema information describing a current structure of the third database server;
    comparing the third set of schema information to a master schema, the master schema representing an expected set of schema information for a plurality of database servers, the plurality of database servers including the third database server, said step of comparing the third set of schema information to a master schema initiated by the maintenance server;
    generating a second difference file responsive to said step of comparing the third and master set of schema information; and
    generating an alarm if the first or second difference file indicates that the first set of schema information is different from the second set of schema information or the third set of schema information is different from the master schema.

2. The method of claim 1, further comprising: selecting the first database server and the second database server from a list of comparable database servers expected to have a matching set of schema information.

3. The method of claim 1, further comprising:
    identifying the first database server and the second database server from a list of database servers expected to have matching schemas;
    adding the first database server and the second database server to a comparison gueue;
    performing said steps of retrieving, comparing and generating when the first database server and the second database server have placed in the comparison gueue.

4. The method of claim 3, wherein the second difference file is a diffgram.

5. The method of claim 1, wherein the first database server and second database server are randomly selected from a list of comparable database servers.

6. The method of claim 1, further comprising:
    retrieving server topology information, the first database server and the second database server selected from the server topology information.

7. The method of claim 1, further comprising:
    determining at least one of the first set of schema information and second set of schema information differ with respect to each other; and
    repairing at least one of the first set of schema information and second set of schema information to conform with the master schema.

8. The method of claim 7, wherein the alarm includes the first or second difference file.

9. The method of claim 7, wherein the database servers are SQL servers.

10. The method of claim 7, further comprising:
    repairing a database server associated with schema information that differs from database server having conforming schema information.

11. A system for determining a conformance of a server, comprising:
    a computer storage medium;
    a plurality of database servers comprising a first, second and third database server;
    a master schema source including a master schema representing an expected set of schema information for the plurality of database servers;
    a maintenance server comprising a comparator engine and a difference file generator, the maintenance server retrieving a first set of schema information from the first database server, the first set of schema information describing a current structure of the first database server, retrieving a second set of schema information from the second database server, the second set of schema information describing a current structure of the second database server, and retrieving a third set of schema information from the third database server, the third set of schema information describing a current structure of the third database server:
    the comparator engine, initiated by the maintenance server, comparing the first set of schema information to the second set of schema information to determine if the schema information for the first database server and the second database server are different and comparing the third set of schema information to the master schema;
    the difference file generator responsive to the comparator engine, the difference file generator generating a first difference file responsive to the comparison of the first and second set of schema information and generating a second difference file responsive to the comparison of the third and master set of schema information; and
    an alarm server responsive to the difference file generator, the alarm server generating an alarm if the first or second difference file indicates that the first set of schema information is different from the second set of schema information or the third set of schema information is different from the master schema.

12. The system of claim 11, further comprising:

the computer storage medium having server topology information, said comparator engine compares database server schema from one or more of said plurality of database servers selected from the server topology information.

13. The system of claim 11, wherein the first set of schema information and the second set of schema information expected to match.

14. The system of claim 11, wherein said comparator engine compares database server schema of one of the plurality of database servers to database server schema of another of the plurality of database servers.

15. The system of claim 11, wherein the second difference file is a diffgram.

* * * * *